United States Patent [19]

Cornell

[11] 4,348,448
[45] Sep. 7, 1982

[54] MOLDING STRIP HAVING A CURVILINEAR SURFACE AND A METHOD FOR MAKING SAME FROM LAMINAR SHEET MATERIAL

[76] Inventor: Richard R. Cornell, 334 W. State St., Newcomerstown, Ohio 43832

[21] Appl. No.: 299,852

[22] Filed: Sep. 8, 1981

[51] Int. Cl.³ .................. B32B 3/04; B32B 3/12; B32B 3/26
[52] U.S. Cl. .................. 428/157; 156/79; 428/124; 428/160; 428/172
[58] Field of Search ............. 428/121, 124, 126–129, 428/157–160, 167, 172, 173; 156/79

[56] References Cited

U.S. PATENT DOCUMENTS

| | | | |
|---|---|---|---|
| 3,731,449 | 5/1973 | Kephart, Jr. | 428/160 |
| 3,869,106 | 3/1975 | Gregov | 428/81 |
| 3,935,049 | 1/1976 | Schmidt et al. | 428/121 |
| 3,969,868 | 7/1976 | Bainter et al. | 428/167 |

*Primary Examiner*—William J. Van Balen
*Attorney, Agent, or Firm*—Hamilton, Renner & Kenner

[57] ABSTRACT

The present invention is directed not only to a method for processing composite sheet material comprising a substrate to one flat surface of which a facing has been laminated but also to the resulting article of manufacture. The process permits the facing material to be shaped to a predetermined, curvilinear configuration. This result may be accomplished by incising a groove in that surface of the substrate opposite the surface thereof to which the facing is laminated so as to provide a freeform span of the facing. Adhesive is applied to selected portions of the substrate, and a predetermined charge of foam forming reactants are deposited along the groove. Thereupon the freeform span is bent to the desired configuration and, if required, so maintained while the foam forms and the adhesive sets.

7 Claims, 8 Drawing Figures

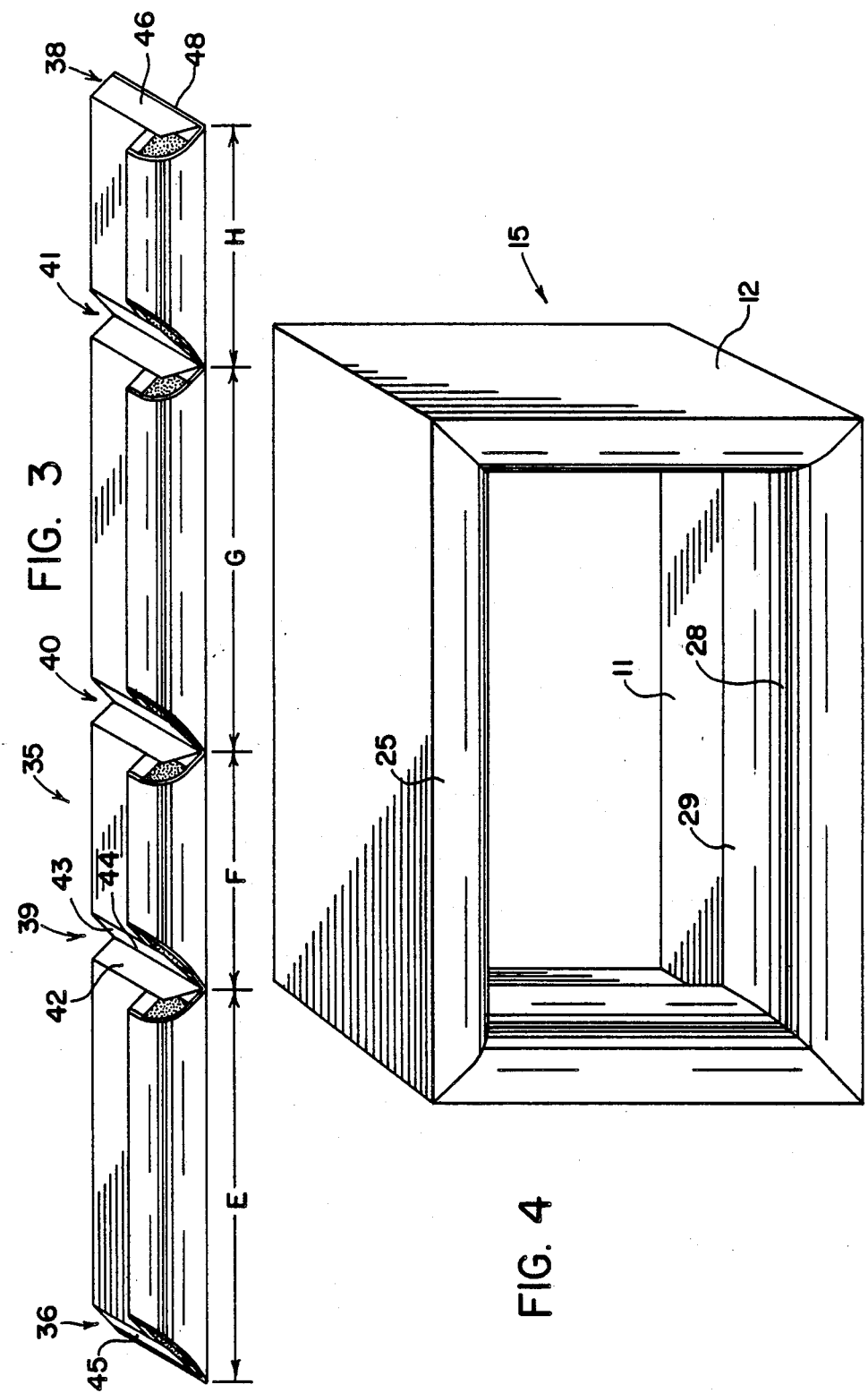

MOLDING STRIP HAVING A CURVILINEAR SURFACE AND A METHOD FOR MAKING SAME FROM LAMINAR SHEET MATERIAL

TECHNICAL FIELD

The present invention relates to the folding of decoratively clad sheet material. More particularly, the present invention relates to the structural configuration of a unique molding strip, and the process by which to accomplish the folding of a laminar faced base material, or substrate, so as to effect the presentation of a curvilinear surface by the laminar facing. Specifically, the present invention relates to the structural configuration of a curvilinear fold so as to permit further machining thereof without deleteriously affecting the appearance, or physical integrity, of the initially curved fold, and the method by which to accomplish the same.

BACKGROUND ART

With the advent of decoratively clad, or faced, sheet materials, they were immediately adopted for use in making table tops, furniture cabinets, countertops, kitchen cabinets and the like. Because of the decorative finish on the face of these materials, they require no finishing after they are assembled. Moreover, they are extremely durable.

Such materials utilize a strength providing base, or substrate, such as plywood, fiberboard or other composition board faced with a thin sheet, or veneer, of decorative film or wood bonded to the base. The facing is often only a few thousandths of an inch thick, and the base is usually an eighth, a quarter or some other dimensional fraction of an inch standard to structural materials.

This composite material is manufactured in modular dimensional sheets such as four by eight, four by twelve or the like, and is accordingly rather flexible. To construct items having finished surfaces in more than one plane from this material, it was historically necessary to assemble planar components of the item formed from the material with the finish veneer facing in the proper direction and join the corners in a mitered fit in order to prevent the unfinished edges of the base from showing. However, in even the most meticulously mitered joints the joinder line of the thin, finish veneer stands out as an unsightly reminder that the material is a facsimile of that apparent from the design of the facing. This is especially noticeable when the facing simulates a wood grain.

Further complications are attendant upon accurately rabbeting or grooving such laminar sheet materials because the variation in the thickness of the base may be in the range of twenty to thirty thousandths of an inch and the thickness of the facing to which the cut must extend is on the order of one tenth that amount.

These difficulties were obviated, and the usefullness of this sheet material was enhanced by the ability to fold the sheet material and thus form a construction that presents a continuous finished surface in more than one dimension. As disclosed in U.S. Pat. No. 3,456,701, an angular fold can be formed in the sheet material by accurately mitering a groove in the back of the sheet material and then bending the sheet to form an angular fold and at the same time maintaining a continuous unbroken continuity in the facing even after the sheet material has been folded along the groove.

In many applications it is desirable either for aesthetic or functional reasons to employ a fold that presents a curvilinear surface instead of the linear intersecting surfaces presented by the angular folding technique disclosed in the said U.S. Pat. No. 3,456,701. However, it is also highly desirable that the fold which results in the presentation of a curvilinear surface provide two properties inherent to the prior art fold which presents the linear intersecting surfaces—i.e., the properties of stability and further machinability.

DISCLOSURE OF THE INVENTION

It is, therefore, a primary object of the present invention to provide a method by which to process a flexible, laminar, composite sheet so that the laminar facing—or surface veneer—presents a curvilinear surface.

It is another object of the present invention to provide a method, as above, whereby the laminar facing presents a continuous unbroken continuity even after it has been folded to present a curvilinear surface.

It is a further object of the present invention to provide a method, as above, whereby the laminar sheet material can be prepared and the fold effected in a substantially continuous operation.

It is yet another object of the present invention to provide a structurally sound configuration by which to present a curvilinear surface with the laminar facing on a composite laminar sheet material.

It is a still further object of the present invention to provide a structurally sound configuration, as above, whereby the resulting curvilinear surface is sufficiently stable to permit further processing, as required in order to permit folding of the laminar sheet material whereby to effect mitered intersections of the curvilinear surface without destroying the unbroken continuity of the laminar facing along the fold line between adjacent linear surfaces.

These and other objects, together with the advantage thereof over existing and prior art forms which will become apparent from the following specification, are accomplished by means hereinafter described and claimed.

In general, the present invention is directed to the structural arrangement resulting from processing and folding laminar sheet material such that the facing material, or veneer, presents a curvilinear surface conforming to a predetermined cross sectional configuration. When embodying the structural arrangement disclosed herein even the curvilinear surface can be further processed to permit secondary folding of the sheet material whereby to permit a mitered intersection of the curvilinear surfaces and at the same time maintain continuity of the laminar facing on linear surfaces adjacent the curvilinear surfaces when said sheet is so folded.

The process by which laminar sheet material can be folded so that the laminar facing presents a curvilinear surface begins by accurately machining a groove or rabbet in the substrate of a flexible laminar sheet material to the depth, and to the width, that allows the remaining freeform span of the facing material to be folded into the desired curved shape without cracking or splitting. An adhesive is applied to the groove and other surfaces that are to be in contact when the fold is completed. Substantially simultaneously with the application of the adhesive, a filling material, such as a plastic foam, is placed within the groove, or rabbet, in the volume necessary to fill the entire void that would otherwise be formed when the sheet material is folded as desired. It should be appreciated, however, that in the event the filling material is capable of imparting sufficient rigidity when the void is only partially filled, only that volume need be employed.

The sheet material is then folded into the desired curved position and held in this position until the previously applied adhesive permanently bonds the contact surfaces of the sheet material and the filling material expands to support the free span of the facing material. The filling material should become sufficiently rigid to provide support for the freeform span of the facing material and permanently retain the curved shape imparted thereto.

It has been found that without employing the filling material the free span cannot be readily processed in preparation for secondary folding. When not properly supported the free span tends to vibrate and chatter so that the laminar facing chips, or tears. The presence of the filling material precludes vibration and chattering as well as the resultant chipping and tearing.

One preferred embodiment is shown by way of example in the accompanying drawings and described in detail without attempting to show all of the various forms and modifications in which the invention might be embodied; the invention being measured by the appended claims and not the details of the specification.

BRIEF DESCRIPTION OF THE DRAWINGS

FIG. 3 is a perspective view sequential to FIG. 2 depicting the initially folded sheet material further rabbeted to permit secondary folding;

FIG. 4 is an enlarged perspective view sequential to FIG. 3 depicting the sheet material secondarily folded such that the curvilinear surfaces join at mitered intersections with the laminar facing material on the linear surfaces adjacent the secondary fold presenting a continuous, unbroken continuity across the fold, all to provide a shadow-frame;

PREFERRED MODE FOR CARRYING OUT THE INVENTION

The decorative clad sheet material employed by the present invention is generally designated by the numeral 10 on the enclosed drawings and comprises a base, or substrate, 11 which may be wood, plywood, masonite, particle board, pressboard or other strength imparting material to which a decorative film facing 12 has been laminated. At the present time a wide variety of films are available to simulate various wood grains so that by laminating the desired film facing 12 to an inexpensive substrate 11, a considerable cost reduction can be achieved.

To facilitate understanding the present invention, the procedure employed to fabricate the simulated woodgrain shadow-frame 15 depicted in FIG. 4 will be explained in detail.

Figure 1:
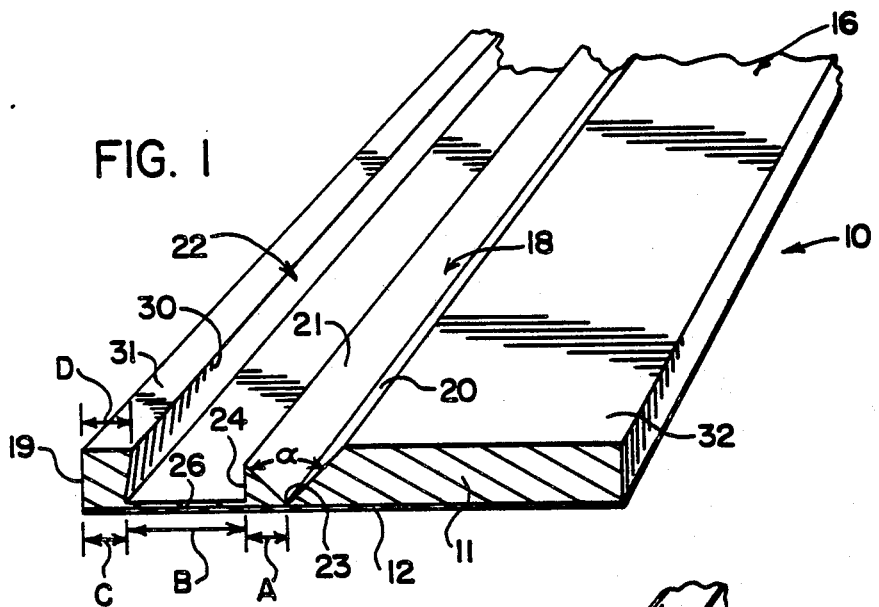
FIG. 1 is a perspective view of an elongate strip of laminar sheet material the substrate of which has been rabbeted to permit initial folding.

The elongate strip 16 of decoratively clad sheet material 10 depicted in FIG. 1 may be rabbeted on the apparatus to which U.S. Pat. No. 3,322,171 is directed or according to the method to which U.S. Pat. No. 3,456,701 is directed. This will result in incising a first groove, or rabbet, 18 parallel to the longitudinal edge 19 of the strip 16. For the particular cross sectional configuration chosen the angle $\alpha$ is rabbeted to be 90°. This will permit the opposed side surfaces 20 and 21 of the first groove 18 to become contact surfaces that can be joined together by adhesive when the initial fold is effected.

Laterally displaced from the first groove 18 is a second groove, or rabbet, 22. The lateral separation "A" between the apex 23 of the converging surfaces 20 and 21 forming groove 18 and the proximal edge 24 of the second groove 22 is determined by the desired dimension for the outermost linear surface 25 on the finished shadow-frame 15.

The second groove 22 produces a freeform span 26 of the film facing 12, the lateral dimension "B" of which is determined by the desired, or required, peripheral extent of the curvilinear surface 28 on shadow-frame 15. The curvilinear surface 28 merges into a linear return surface 29. The depth of the linear return desired for the shadow-frame 15 is determined by the lateral dimension "C" depicted in FIG. 1.

It will be observed that the lateral edge 30 which extends longitudinally along, and defines the side of, the second groove 22 proximal edge 19 of the strip 16 is undercut so that the lateral dimension "D" of the unclad surface 29 is greater than the dimension "C". This is desired in order to provide the maximum contact area between surface 31 and the surface 32 when the fold is accomplished.

The aforedescribed configuration delineates the grooving required to accomplish the initial folding. However, prior to folding, an appropriate adhesive should be applied to at least the contact surfaces 20, 21, 31 and 32 and a filler material deposited within the second groove 22. It may also be acceptable, and, in fact, desirable, to apply the adhesive to the surfaces defining groove 22 in order to provide, or enhance, the adhesion between the freeform span 26 and the filler material.

Although a wide variety of filler materials are available, polyurethane foam, or other foaming plastics having similar characteristics, have been found to work quite satisfactorily.

Polyurethane foams are cellular materials prepared primarily by the reaction of polyisocyanates, polyesters and water, in the absence of air. Tertiary amines may be used as catalysts to accelerate the foaming and curing reactions. These foams have the advantage that they can be quickly foamed in place and are self-curing, due to the exothermic heat of reaction generated in the foaming reaction.

The density and physical properties of polyurethane foams can be controlled within wide ranges by regulating the amount of water and excess polyisocyanate used in the formulation. The foams are substantially flame-resistant and can be formulated to range from flexible to substantially rigid.

A mixture of the reactant materials which will produce polyurethane foam having the physical characteristics desired for the use to which the finished product will be put are deposited within the groove 22, and the initial fold is made to bring the contact surfaces into engagement. The engagement is maintained, as required, to permit the previously applied adhesive to bond and at the same time permit the reaction by which the foam is formed to run to completion.

Figure 2:
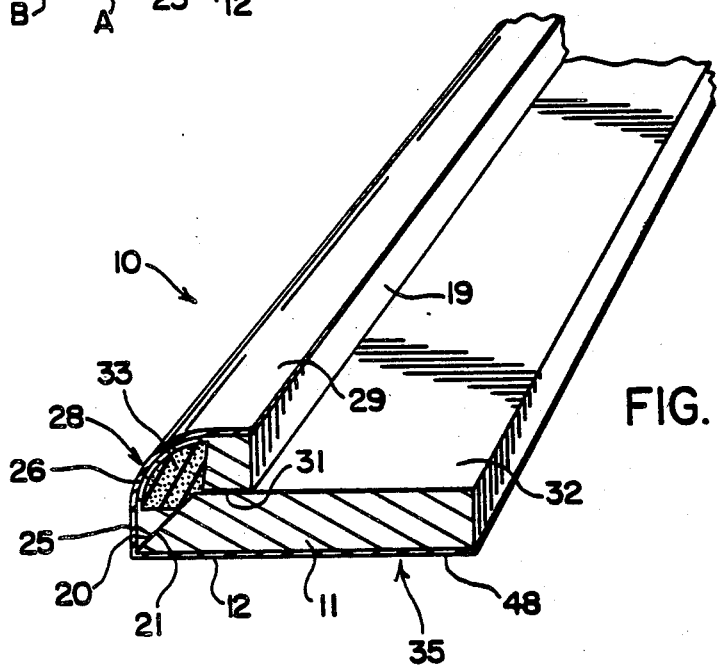
FIG. 2 is a perspective view sequential to FIG. 1 depicting the rabbeted strip of sheet material initially folded so that the freeform span of the laminar facing material presents a curvilinear surface.

FIG. 2 depicts the contact surfaces 20 and 21 as well as contact surfaces 31 and 32 in engagement and bonded by the film of adhesive therebetween. In addition, FIG. 2 depicts the foamed polyurethane 33 expanded to support what will become the curvilinear surface 28 of the shadow-frame 15 formed from the freeform span 26.

The steps of: incising the substrate 11 to form the grooves 18 and 22; applying the adhesive to contact surfaces 20, 21, 31 and 32; depositing the reactant materials which form the polyurethane foam 33; and, initially folding the strip 16 can be accomplished in a substantially continuous operation, thus resulting in an efficient method for making curvilinear surfaces, or, as depicted in FIG. 2, a combination of linear and curvilinear surfaces which combine to present a molding strip 35.

In addition to stabilizing the curvilinear surface 28 to maintain the desired aesthetic configuration, the polyurethane foam 33 also stabilizes the decorative facing film 12 forming surface 26 so that cross grooving of the molding strip 35 can be accomplished, if desired.

Continuing with the example of the shadow-frame 15, the molding strip 35 can, as depicted in FIG. 3—be cross grooved at five locations—viz., to provide the two terminal cuts 36 and 38 and the three intermediate cross rabbets 39, 40 and 41. The aforesaid cross grooves can also be accomplished on the apparatus and/or according to the method to which U.S. Pat. Nos. 3,322,171 and 3,456,701, respectively, are directed.

The angularity of each groove will depend upon the configuration of the item into which the molding strip 35 is to be folded. In the present example of a rectangular shadow-frame 15 the intermediate rabbets 39, 40 and 41 are each cut so that the converging side walls 42 and 43 define an angle of 90° disposed symmetrically about a plane oriented transversely of the strip 35 at the apex 44 of each rabbet. The surfaces 45 and 46 resulting from the terminal cuts 36 and 38, respectively, are disposed at an angle $\theta$ of 45° with respect to a reference plane oriented transversely of the molding strip 35 and disposed perpendicularly to the unfolded, planar surface 48 of the facing 12.

The location of the cross grooves along the length of the molding strip 35 is also predetermined to provide the desired dimensions for the finished shadow-frame 15. For example, the dimension "E" between the one terminal cut 36 and the nearest cross rabbet 39 may be selected to provide the longest of the desired dimensions for the rectangular shadow-frame 15. As such, the dimension "F" between the aforesaid cross rabbet 39 and the medial cross rabbet 40 will provide the shorter of the desired dimensions for the rectangular shadow-frame 15. Dimension "G" (between cross rabbets 40 and 41) would then be required to equal dimension "E", and dimension "H" (between cross rabbet 41 and the opposite terminal cut 38) would equal dimension "F".

With each cross groove so shaped and disposed an adhesive is applied to each surface 45 and 46 of the terminal cuts as well as each side wall 42 and 43 of the rabbets 39, 40 and 41. The cross grooved molding strip 35 is then secondarily folded to close each cross rabbet and bring the surfaces 45 and 46 of the terminal cuts into contact. The secondarily folded molding strip 35 is then maintained until the adhesive bonds to form the shadow-frame 15—each cross groove providing a mitered intersection between two adjacent sidewalls of the finished frame 15.

Once the basic concept of the present invention is understood, as heretofore described, it should be apparent that the wide variety of artistic configurations that can be made in accordance therewith is restricted only by one's imagination.

Two further exemplary configurations are depicted in FIGS. 5 through 8.

Figure 5:
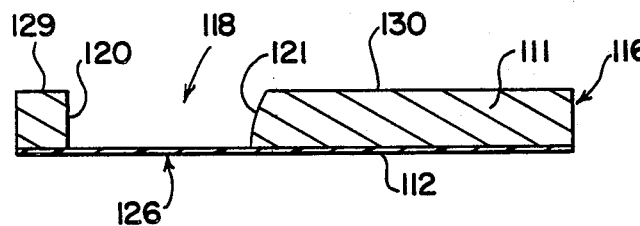
FIG. 5 is an end elevation of a piece of laminar sheet material, the substrate of which has been rabbeted in a manner selected to permit initial folding whereby the laminar facing presents a curvilinear surface, the cross sectional profile of which is a variation from that depicted in FIG. 2.
Figure 6:
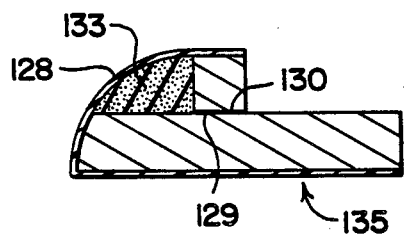
FIG. 6 is an end elevation sequential to FIG. 5 depicting the variation in cross sectional profile of the freeform span achieved by folding the sheet material depicted in FIG. 5.

In FIG. 5 a groove 118 is incised into the substrate 111 of an elongate strip 116 to produce a freeform span 126 of the film facing 112. Side surface 120 of the groove 118 may be oriented perpendicularly with respect to the facing 112, but the side surface 121 is convex so that when the initial fold is accomplished a portion of the freeform span 126 will conform to, and overlie, surface 121.

As the initial fold is concluded, the surfaces 129 and 130 are brought into contact and maintained until the adhesive applied thereto bonds those surfaces together. While the surfaces 129 and 130 are being maintained in contiguous juxtaposition for bonding, the polyurethane reactant materials deposited within the groove 118 adjacent the side surface 120 will foam, as at 133 in FIG. 6, to stabilize and support that portion of the previously freeform span 126 not directly overlying the convex surface 121 in the continuation of the curvilinear disposition identified as surface 128 on the molding strip 135 depicted in FIG. 6.

Figure 7:
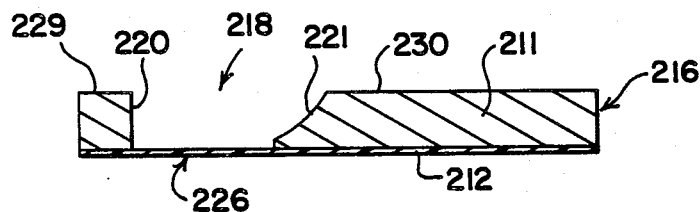
FIG. 7 is an end elevation of a piece of laminar sheet material, the substrate of which has been rabbeted in a manner selected to permit initial folding whereby the laminar facing presents a curvilinear surface, the cross sectional profile of which is a further variation from that depicted in FIGS. 2 and 6; and, FIG. 8 is an end elevation sequential to FIG. 7 depicting the further variation in cross sectional profile of the freeform span achieved by folding the sheet material depicted in FIG. 7.

In FIG. 7 a groove 218 is incised into the substrate 211 of an elongate strip 216 to produce a freeform span 226 of the film facing 212. Side surface 220 of the groove 218 may be oriented perpendicularly with respect to the facing 212, but the side surface 221 is concave so that when the initial fold is accomplished a portion of the freeform span 226 will conform to, and overlie, surface 221.

When the surface 221 is concave it is particularly desirable to apply an adhesive thereto in order to assure that the portion of the span 226 overlying that surface will remain in conformity therewith.

Figure 8:
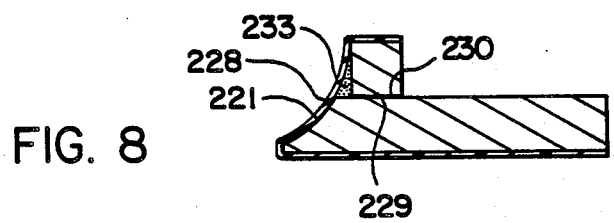

An adhesive will also be applied to surfaces 229 and 230 so that as those two surfaces are brought into contact during the initial fold, and so maintained, they will bond together. A predetermined quantity of the polyurethane reactant materials is deposited on that portion of the span 226 adjacent side surface 220 thereof so that after the initial fold is accomplished the foam 233, as depicted in FIG. 8, will support and stabilize that portion of the span 226 not directly overlying the concave surface 221.

While maintaining the surface 229 and 230 in contiguous juxtaposition as the adhesive bonds, and while the reactant materials foam it may, because of the concave disposition desired of surface 228 (FIG. 8), be necessary to apply a shaping form, not shown, against the span 226 so that the foaming reaction will not contort the desired concavity of the curvilinear surface 228.

It should now be apparent that the present invention not only provides a method by which efficiently to process a flexible, laminar, composite sheet so that the laminar facing thereon will present a curvilinear surface but also a structurally sound resulting configuration that is sufficiently stable to permit further processing as well as accomplishing the other objects of the invention.

I claim:

1. A method for processing a flexible, composite sheet having a substrate to at least one side of which a facing has been laminated, comprising the steps of:
   incising a groove in the side of the substrate opposite the facing to provide a freeform span of the facing;
   applying an adhesive to at least selected portions of the substrate;
   depositing a predetermined charge of foam forming reactants in at least a portion of the groove;
   folding said sheet about the freeform span to bring the adhesive coated portions of the substrate into contact;
   maintaining said contact while the adhesive bonds; and,
   foaming the reactant materials to support at least a portion of the freeform span.

2. A method, as set forth in claim 1, which incorporates the additional steps of:
   shaping one side surface of the groove to the curvilinear configuration desired for the facing; and,
   bringing at least a portion of the freeform span into contact with the shaped side surface of the groove.

3. A method, as set forth in claim 2, which incorporates the additional step of applying an adhesive to the shaped side surface of the groove.

4. A method, as set forth in claim 3, which incorporates the additional step of maintaining the adhesive coated surfaces in contact until the adhesive bonds the contacting surfaces together.

5. A method, as set forth in claim 4, which incorporates the additional step of applying a shaping form to at least that portion of the freeform span against which the reactant materials foam.

6. A molding strip produced by the method of claim 1.

7. A molding strip comprising:
   a strip of sheet material in the form of a substrate and a laminar facing secured to the substrate;
   a groove in the substrate, said groove having spaced side walls with the laminar facing spanning between said side walls;
   said span of laminar facing defining a surface of curvilinear disposition; and,
   at least a portion of the laminar facing defining the curvilinear surface being supported and maintained by a foamed plastic material.

* * * * *